United States Patent
Kiefer et al.

[11] Patent Number: 6,035,696
[45] Date of Patent: Mar. 14, 2000

[54] SCAN ASSEMBLY AND METHOD FOR CALIBRATING THE WIDTH OF AN INPUT PULSE TO AN ULTRASONIC TRANSDUCER OF THE SCAN ASSEMBLY

[75] Inventors: Karl F. Kiefer, Woodlands, Tex.; Donald L. Chaffee, Park City, Utah

[73] Assignee: Gas Research Institute, Chicago, Ill.

[21] Appl. No.: 08/833,805

[22] Filed: Apr. 9, 1997

Related U.S. Application Data

[63] Continuation of application No. 08/497,033, Jun. 30, 1995, abandoned, which is a continuation-in-part of application No. 08/222,621, Apr. 5, 1994, Pat. No. 5,641,909.

[51] Int. Cl.$^7$ .................. G01H 13/00; H04B 17/00
[52] U.S. Cl. ............. 73/1.82; 73/DIG. 1; 364/571.01
[58] Field of Search ............... 364/571.01, 578, 364/579, 484; 73/1 DV, 432.1, DIG. 1, DIG. 4, 602, 1.82, 623

[56] References Cited

U.S. PATENT DOCUMENTS

| | | | |
|---|---|---|---|
| 2,723,357 | 11/1955 | Valkenburg et al. | 310/8.7 |
| 3,714,816 | 2/1973 | Miller | 73/71.5 |
| 3,763,694 | 10/1973 | Rathburn et al. | 73/71.5 |
| 4,055,990 | 11/1977 | Topping | 73/623 |
| 4,131,018 | 12/1978 | Muller et al. | 73/432 |
| 4,285,243 | 8/1981 | Collingwood | 73/623 |
| 4,289,025 | 9/1981 | Norel et al. | 73/152 |
| 4,302,976 | 12/1981 | Bull | 73/639 |
| 4,304,134 | 12/1981 | Rouse et al. | 73/634 |
| 4,311,922 | 1/1982 | Packette | 307/270 |
| 4,506,549 | 3/1985 | Thome | 73/582 |
| 4,611,494 | 9/1986 | Uchiyama | 73/626 |
| 4,615,218 | 10/1986 | Pagano | 73/639 |
| 4,621,532 | 11/1986 | Takagi et al. | 73/623 |
| 4,691,572 | 9/1987 | van den Berg et al. | 73/643 |
| 4,718,277 | 1/1988 | Glascock | 73/622 |
| 4,735,087 | 4/1988 | Homrani et al. | 73/597 |
| 4,769,598 | 9/1988 | Krieg et al. | 324/219 |
| 4,837,753 | 6/1989 | Morris et al. | 367/69 |
| 5,007,291 | 4/1991 | Walters et al. | 73/640 |
| 5,014,711 | 5/1991 | Nagasaki | 128/660.07 |
| 5,046,033 | 9/1991 | Andreasen et al. | 364/580 |
| 5,072,414 | 12/1991 | Buisker et al. | 364/550 |
| 5,079,751 | 1/1992 | Woodward | 367/96 |
| 5,146,432 | 9/1992 | Kimball et al. | 367/13 |
| 5,150,334 | 9/1992 | Crosby | 367/98 |
| 5,170,346 | 12/1992 | Crawford et al. | 364/413.16 |
| 5,204,622 | 4/1993 | McCaslin et al. | 324/220 |
| 5,216,622 | 6/1993 | Kibblewhite et al. | 364/508 |
| 5,254,944 | 10/1993 | Holmes et al. | 324/220 |

*Primary Examiner*—Hezron E. Williams
*Assistant Examiner*—Rose M. Miller
*Attorney, Agent, or Firm*—Thomas, Kayden, Horstemeyer & Risley

[57] ABSTRACT

An ultrasonic scan assembly is adapted to efficiently and accurately scan a surface and cross-section of a wall of an underground gas pipe with ultrasonic energy transmitted and received by an ultrasonic transducer provided therein. The input pulse applied to the ultrasonic transducer is calibrated so that its width matches the natural mechanical resonant frequency of the ultrasonic transducer. As a result, the energy efficiency of the transducer is maximized and the accuracy of the scan is improved.

6 Claims, 6 Drawing Sheets

SCAN ASSEMBLY AND METHOD FOR CALIBRATING THE WIDTH OF AN INPUT PULSE TO AN ULTRASONIC TRANSDUCER OF THE SCAN ASSEMBLY

The present application is a File Wrapper Continuation application of a application entitled "Scan Assembly and Method for Calibrating the Width of an Input Pulse to an Ultrasonic Transducer of the Scan Assembly", filed on Jun. 30, 1995, and assigned Ser. No. 08/497,033 now abandoned which in turn is a Continuation-In-Part application of a patent application entitled "Scan Assembly Structure", filed on Apr. 5, 1994, and assigned Ser. No. 08/222,621 now U.S. Pat. No. 5,641,909.

FIELD OF THE INVENTION

The present invention relates generally to the inspection of and discovery of defects in buried natural gas pipes, and more particularly, to a method and apparatus for improving the energy efficiency of an ultrasonic transducer of a downhole scan assembly utilized to inspect gas pipes by calibrating the width of the interrogating pulse produced by the transducer to match the mechanical impedance of the transducer.

BACKGROUND OF THE INVENTION

Thousands of miles of buried natural gas pipes of varying size and formed from various materials are presently in service. All of these mains are in some state of progressive degradation. In most instances, the extent of such degradation is unknown, and hence, the serviceability of the mains is similarly unknown. This lack of information with the respect to the degree of degradation results in unforeseen gas pipe leaks and/or breaks, and necessitates the expending of substantial time and expense in locating these defects so that repairs and/or replacement can be made. Because of the need to detect conditions which might result in gas pipe breaks and/or leaks, an apparatus has been developed for inspecting gas pipes, and such apparatus is usually referred to as a pipe line "pig." Such pipe line "pigs" typically include a housing with a plurality of sensors, such as ultrasonic transducers, mounted to the outer surface thereof in a predetermined configuration or array to contact the inner surface of the gas pipe. As a "pig" moves axially down a gas pipe, the ultrasonic transducer associated therewith produces interrogation pulses which pass through a coupling medium and intercept the surfaces defining the inner diameter and the outer diameter of the pipe and/or any imperfections or flaws within the wall of the gas pipe. The surfaces defining the inner diameter and the outer diameter of the pipe and any imperfections or flaws within the wall of the pipe, in turn, cause the individual return pulses to be transmitted back to the ultrasonic transducer. By knowing the speed of sound in the different mediums through which the interrogation pulse travels (i.e., the coupling medium between the transducer and the pipe wall and the pipe wall itself), the thickness of the wall of the gas pipe can be computed by timing the difference between the return pulse from the surface defining the inner diameter of the pipe wall and the return pulse from the surface defining the outer diameter of the pipe wall. A more thorough discussion of these principles is found in U.S. patent application Ser. No. 08/222,621, filed on Apr. 5, 1994, and entitled "Scan Assembly Structure", the disclosure of which is incorporated herein by reference.

However, because the walls of the gas pipe contain imperfections and are often littered with debris, interrogating pulses transmitted into the wall of the gas pipe from a transducer reflect and refract off the debris and/or the imperfections of the wall at oblique or random angles, scattering the transmitted ultrasonic energy sufficiently such that little to no return pulses are received back at the transducer. The return pulses which are received are often times below the noise threshold and do not register as a return pulse. In addition, because of acoustical (i.e., mechanical) impedance mismatches at the interfaces of the transducer and coupler medium as well as at the interface of the coupler medium and the surface defining the inner diameter of the gas pipe, a portion of the transmitted ultrasonic energy is reflected at these interfaces rather than being transmitting across the interface, thereby even further reducing the amplitude of the return pulse. Accordingly, without an adequate ratio of energy received to energy transmitted, the effectiveness of the ultrasonic inspection is inhibited. This is of critical concern with "pigs" or scan assemblies which are robotic and have energy conservation issues such that merely increasing the amplitude of the interrogating pulse is not a viable option. Moreover, increasing the amplitude typically results in greater distortion of the interrogating pulse and increases reverberation noise, both of which decrease the signal-to-noise ratio and the accuracy of the inspection.

In view of the foregoing, it would be desirable to develop a method of inspecting the walls of gas pipes while under operating flow conditions whereby the energy efficiency of the interrogating pulse is maximized so as to improve signal-to-noise ratio and accuracy of the inspection.

SUMMARY OF THE INVENTION

An object of the present invention is to overcome the deficiencies and inadequacies in the prior art as described above and as generally known in the industry.

Another object of the present invention is to improve the energy efficiency of an ultrasonic transducer of a scan assembly by matching the natural mechanical resonant frequency of the transducer to the pulse width of the interrogating pulse produced by the transducer.

Another object of the present invention is to enable more accurate inspection of gas pipes by providing greater resolution.

Another object of the present invention is to improve the signal-to-noise ratio of an interrogating pulse from an ultrasonic transducer used in a downhole scan assembly.

Briefly stated, the present invention is a method and apparatus for improving the energy efficiency and accuracy of a downhole scan assembly utilized to inspect gas pipes where the scan assembly utilizes an ultrasonic transducer to which an input pulse is applied and a response pulse is received. The present invention essentially calibrates the width of the input pulse so that it matches the natural mechanical resonant frequency of the transducer. This calibration can be accomplished by determining the natural mechanical resonant frequency (i.e., mechanical impedance) of the transducer and then determining an input pulse width that provides maximum energy transfer in the transducer. Alternatively, a trial and error method can be utilized where input pulses of a fixed amplitude and varying width are applied to the transducer and the energy of the return signals measured, keeping all parameters constant. The pulse width providing the largest return energy most closely matches the natural mechanical resonant frequency (i.e., mechanical impedance) of the transducer. The methods of the present invention can be implemented during the fabrication of the scan assembly as an initial calibration or during the operation of the scan assembly under the particular inspection conditions.

Other objects, features, and advantages of the present invention will become apparent from the following description when considered in conjunction with the accompanying drawings. All such additional objects, features, and advantages are intended to be included herein.

BRIEF DESCRIPTION OF THE DRAWINGS

The present invention, as defined in the claims, can be better understood with reference to the following drawings. The drawings are not necessarily to scale, emphasis instead being placed upon clearly illustrating the principles of the invention. Moreover, like reference numerals represent corresponding parts throughout the several views.

DETAILED DESCRIPTION OF THE PREFERRED EMBODIMENT

Figure 1:
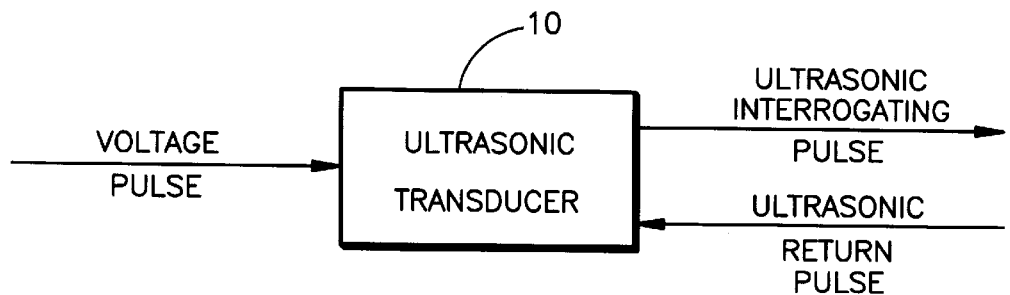
FIG. 1 is a schematic drawing of the operation of a piezoelectric transducer.

Ultrasonic pulses for the inspection of gas pipes can be produced by an ultrasonic transducer, such as a piezoelectric transducer, by the application of an excitation voltage pulse to the input thereof. Referring to FIG. 1, a schematic drawing of a piezoelectric transducer 10 is illustrated. The piezoelectric transducer 10 can be any suitable transducer, such as model F25234 manufactured by Areotech Corporation of Louiston, Pa., U.S.A. or any other suitable transducer that is commercially available. The application of a short excitation voltage pulse to the piezoelectric transducer 10 causes the transducer 10 to produce a sharp pressure pulse (an ultrasonic interrogating pulse) at its output. If this ultrasonic interrogating pulse is applied to some type of material to determine the presence of imperfections, flaws or occlusions therein or the thickness thereof, such defects and/or surfaces defining the material cause the production of return pulses which are directed back toward the piezoelectric transducer 10. When a return pulse is received by the piezoelectric transducer 10, it is converted into a voltage signal which can be monitored or measured. However, to actually register as a return pulse, the pulse must exceed a noise threshold level which is set so as to filter out noise and other unwanted signals such as reverberation. In this manner, the existence and location of defects within the material or the thickness of same can be accurately determined.

It has been found that a relationship exists between the width of the ultrasonic interrogating pulse and the natural mechanical resonant frequency of the transducer which produces optimum results. In essence, when the performance of the transducer is optimized, power into the transducer is minimized without adversely effecting the amplitude of the return pulse and the energy that is typically wasted in unwanted transducer reverberation is reduced. In addition, the optimization of transducer performance results in less distortion of both the ultrasonic interrogating pulse and the return pulses. Thus, optimization of the performance of transducer 10 results in improved measurement resolution.

In order to achieve the optimum performance out of transducer 10, the natural mechanical resonant frequency of the ultrasonic transducer 10 must be determined. As previously stated, the ultrasonic transducer 10 is excited by the application of a short excitation voltage pulse thereto. The direction, or polarity, of the voltage pulse causes deformation of the transducer 10 in one direction while the application of a voltage change of opposite polarity pulse causes deformation in the opposite direction. In essence, the excitation voltage pulse causes the production of an ultrasonic interrogating pulse and the polarity of the excitation voltage pulse causes directional deformation of the transducer 10.

In a typical ultrasonic transducer system, the excitation voltage pulse is applied to the transducer and is subsequently removed at some later time. Since the direction (polarity) of the excitation voltage pulse causes deformation of the ultrasonic transducer, application of the excitation voltage pulse results in two deformation events which are spaced in time. For example, a direct current (DC) voltage excitation pulse is comprised of a positive going waveform (i.e., leading edge) that goes from zero volts to some DC value, the pulse staying at the foregoing DC value for the width of the pulse, and a negative going waveform (i.e., trailing edge) that goes from the foregoing DC value back to zero volts. The positive going waveform causes distortion of the transducer in one direction, and the negative going waveform causes distortion of the transducer in the opposite direction. When the positive going waveform is applied to the ultrasonic transducer 10 causing distortion thereof, the transducer 10 attempts to return to its original shape because of the inherent spring rate in the material comprising same. In order to achieve maximum energy transfer after the positive going waveform (leading edge) is applied to the ultrasonic transducer to start the deformation thereof, the negative going waveform (trailing edge) should be provided at the time when the transducer to go in the opposite direction, as determined by its natural mechanical resonant frequency also referred to as mechanical impedance. Thus, if the negative going waveform (trailing edge) is provided to the transducer 10 when its natural resonant mechanical frequency is causing it to stay positive, system energy will be lost.

An experiment was conducted to determine the effect of the excitation voltage pulse width on the performance of an ultrasonic transducer 10. An excitation voltage pulse having a unit height/amplitude and variable width was utilized. Thus, as the width of the excitation pulse increased, the energy within the pulse similarly increased. Since ultrasonic transducers can usually accommodate changes in excitation voltage pulse width more readily than changes in pulse height, it was decided to keep voltage pulse height substantially constant so that the pulse energy varies as a function of the pulse's width.

Figure 2:
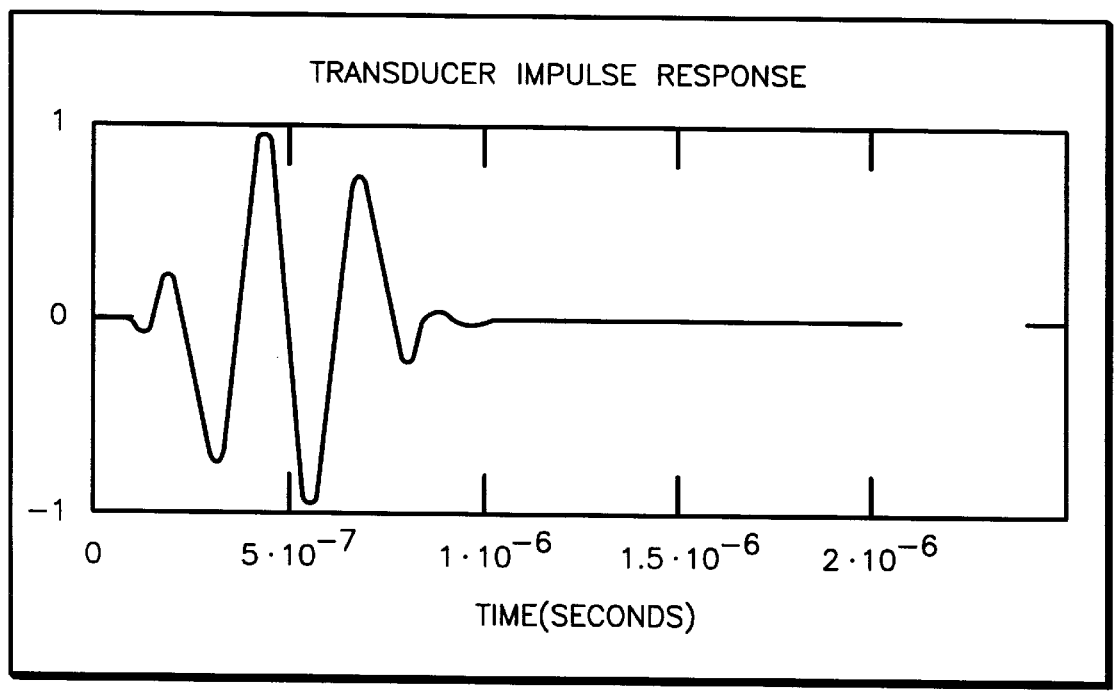
FIG. 2 is a graphical illustration of an impulse response waveform of the transducer of FIG. 1.
Figure 3:
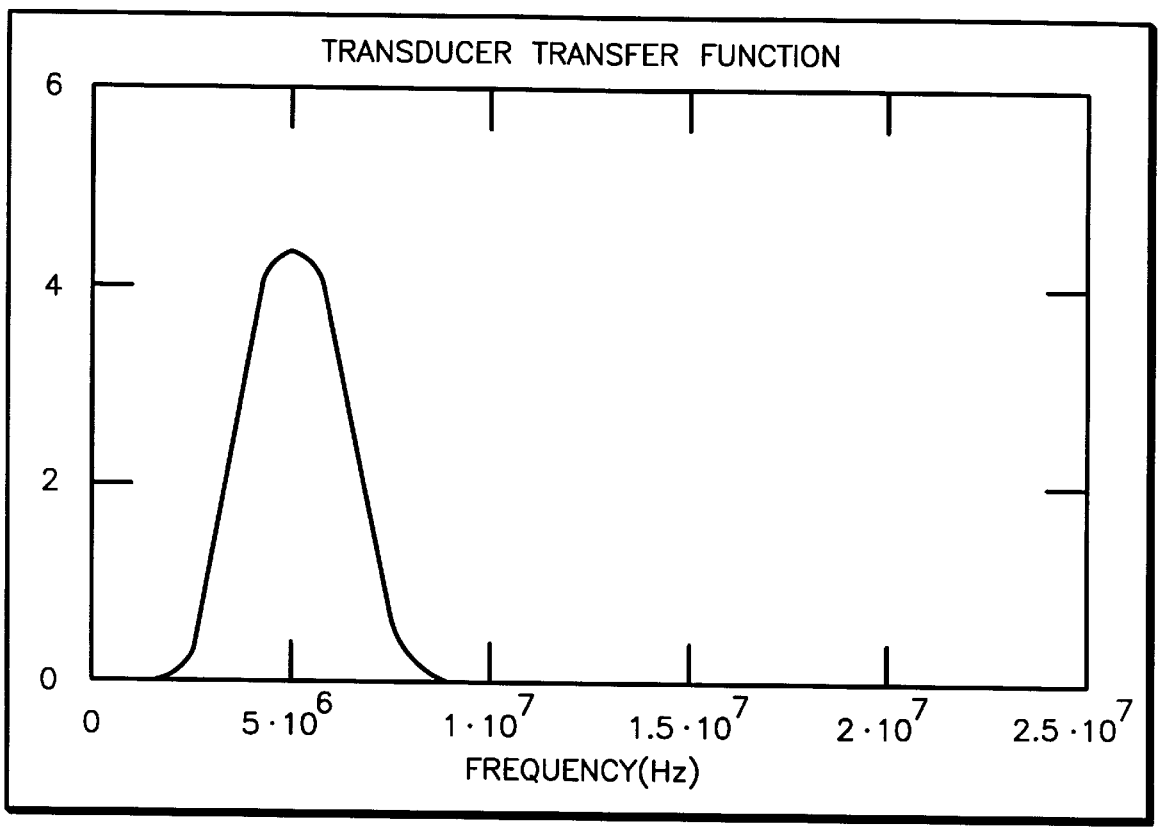
FIG. 3 is a graphical illustration of the frequency domain of the response of FIG. 2.

The type of transducer 10 chosen for purposes of the experiment has an impulse response that can be represented by equation (1) below:

$$g_t = \exp(-t_t - 9q)z)^2 \sin(2\pi f t_t + \Phi) \quad (1)$$

where f=4.7 MHz, q=5×10$^{-7}$, z=4.5×10$^6$, and $\Phi = \pi/4$. A graphical illustration of the impulse response waveform of equation (1) is provided in FIG. 2. The waveform depicted in FIG. 2 represents the response from a target that was recorded using the transducer 10 as both the transmit and receive device. As such, this impulse response is not the typical impulse response of a device but, rather, it is an impulse response of the series combination of the transducer 10 as an electrical to mechanical transformer, the acoustic medium (coupler), the target characteristics, the medium again during the pulse return, and finally the transducer 10 as a mechanical to electrical transformer. A frequency domain representation of the impulse response of FIG. 2 is provided in FIG. 3. A Fast Fourier Transform (FFT) was used to transform the impulse response into the frequency domain and the magnitude of the results are presented therein. As expected, FIG. 3 indicates the transducer has a center frequency of 4.7 MHz and the bandwidth of about 4 MHz. As can be appreciated by reference to FIG. 2, FIG. 3 represents the effect of energy passing through the transducer 10 in either direction as would occur in application.

Figure 4:
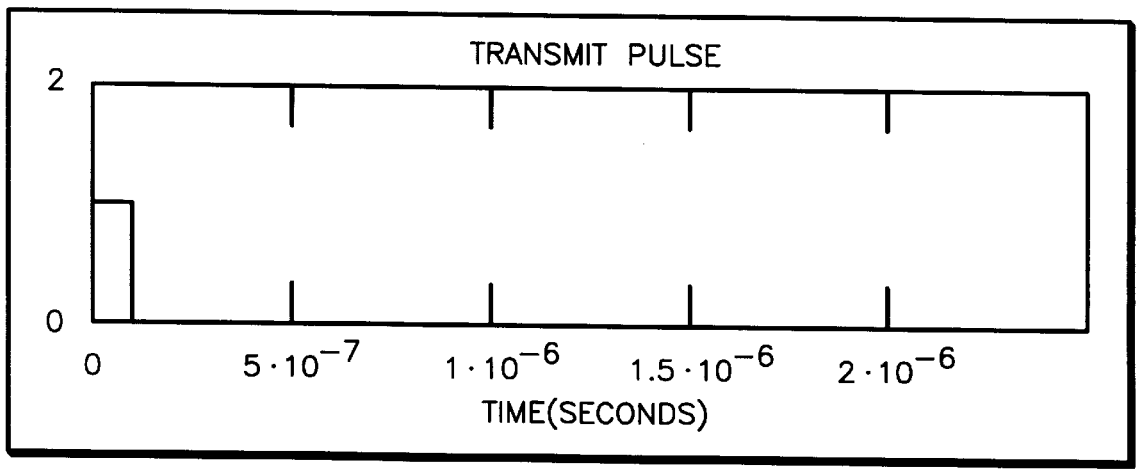
FIG. 4 is a graphical illustration of a 100 nanosecond step input pulse applied to the transducer of FIG. 1
Figure 5:
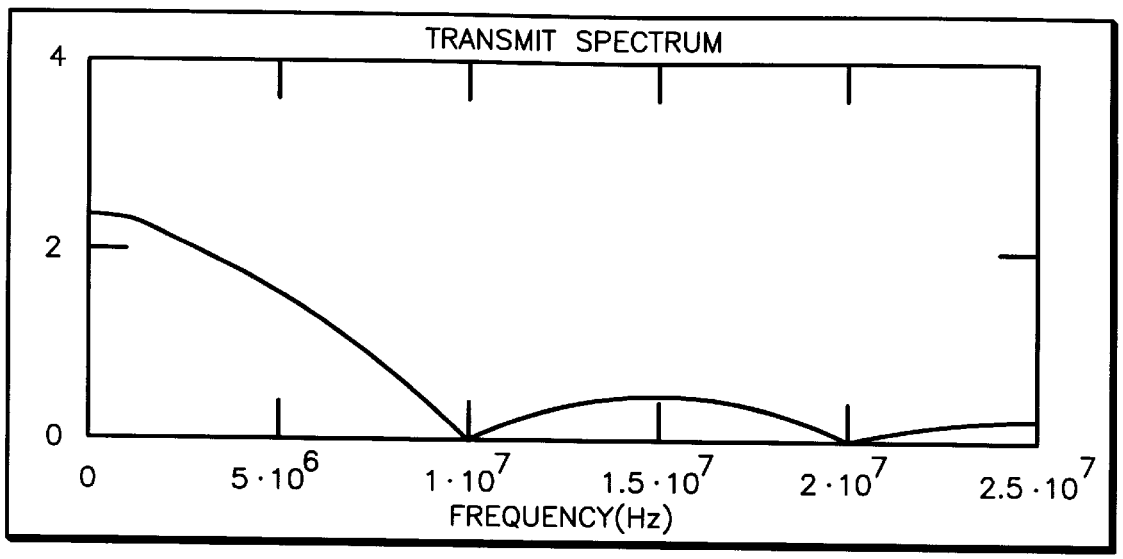
FIG. 5 is a graphical illustration of the frequency domain of the input pulse of FIG. 4.

Of particular importance in this experiment is the response of the transducer 10 to a step input. A step waveform is defined for purposes of the present invention as one which has a zero value until the time of the step where it immediately assumes a value of unity and holds that value as time increases further until a later time where it immediately returns to zero. An illustration of such an input pulse signal produced by a one-shot device for application to transducer 10 is shown in FIG. 4. The pulse in FIG. 4 has a width of about 100 nanoseconds and a frequency domain representation as illustrated in FIG. 5. With reference to FIG. 5 the pulse's frequency domain possess a sin (f)/f shape with nulls at multiples of the inverse of the pulse width. Note, if the width of the pulse of FIG. 4 is doubled, the first energy null in FIG. 5 would shift from about 10 MHz, as shown, to about 5 MHz. This would place the energy null near the middle of the transducer's bandpass (shown in FIG. 3). Because of this, it is anticipated that a pulse width around 200 nanosecond would be a poor selection, as is supported by the results presented below.

Figure 6:
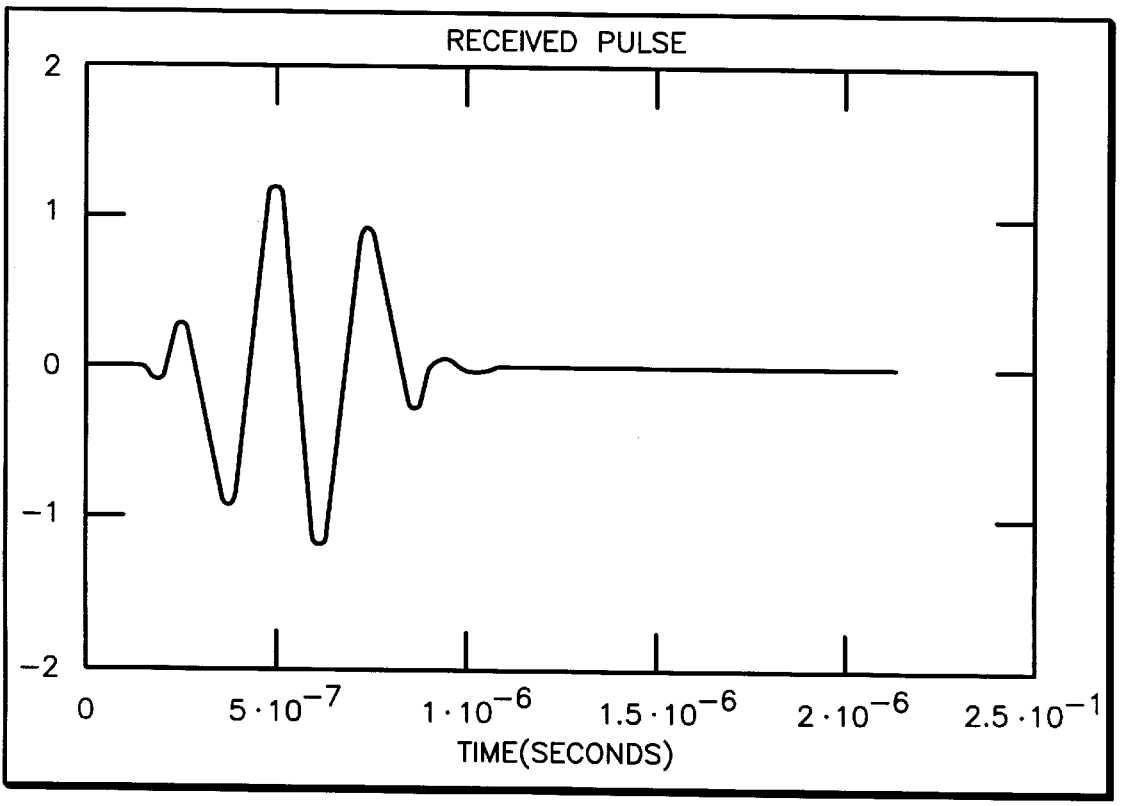
FIG. 6 is a graphical illustration of a signal received by the transducer of FIG. 1 in response to the input pulse of FIG. 4.

The response of transducer 10 to the pulse shown in FIG. 4 is illustrated in FIG. 6. A comparison between FIG. 2 which illustrates the transducer's 10 response to an impulse input and FIG. 6 which illustrates the transducer's 10 response to a step input reveals that the responses are very similar which is expected since they are mathematically related. Further, the pulse width is small enough that it contains significant energy in the frequency band that the transducer 10 passes, as shown by comparison of FIG. 3 (for the transducer 10) and FIG. 5 (for the pulse).

Figure 7:
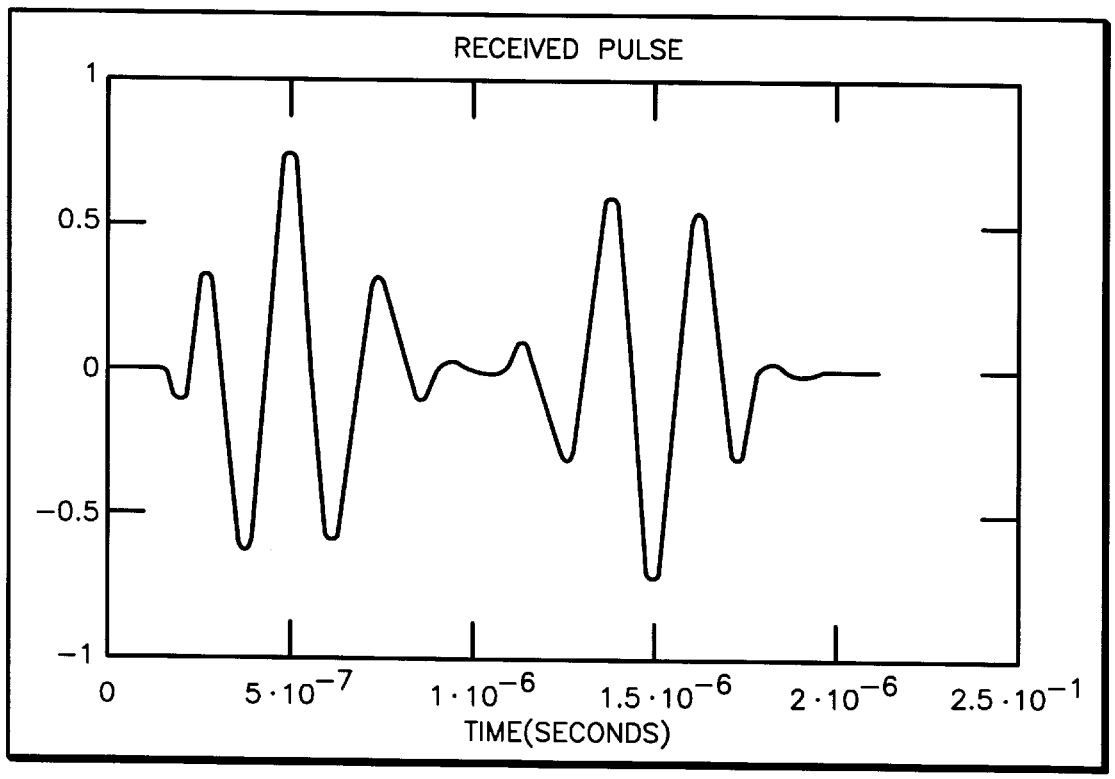
FIG. 7 is a graphical illustration of a signal received by the transducer of FIG. 1 in response to a 1000 nanosecond step input pulse.

For purposes of better understanding the two deformation events of an input pulse, the response of transducer 10 at about 1000 MHz is illustrated in FIG. 7. Note that the response appears as two separate copies of the step response of FIG. 6, the second of which is inverted. This condition results from the fact that a pulse width is larger than the time duration of the step response so that there is no interaction between the two waveform components and they can be clearly seen independent of one another. Thus, further widening of the input pulse would simply increase the separation of these two waveform components which offers no particular advantage and has the disadvantages of increasing the transmit power and reducing measurement. From FIG. 7, it can be appreciated by one skilled in the art that pulse widths between 100 and 1000 MHz cause the two waveform components to have varying degrees of interaction, defined as either constructive or destructive depending upon the time alignment specified by the transmit pulse width.

Figure 8:
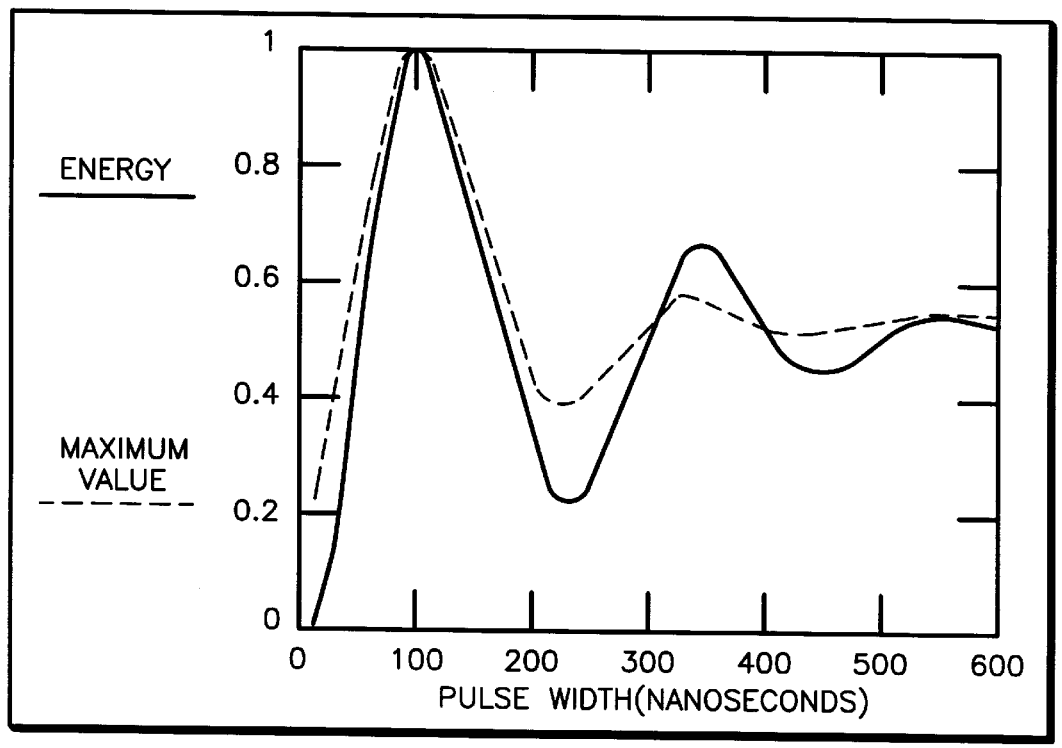
FIG. 8 is a graphical illustration of the received energy and maximum value versus input pulse width for the transducer of FIG. 1.

In the experiment, input pulses of widths varying between 10–600 nanoseconds were applied to the transducer described above. Provided in FIG. 8 is a graphical illustration of the energy of the return pulse and their maximum value as a function of pulse width. Both the energy and maximum value have been normalized in FIG. 8 by their largest value. As apparent from viewing FIG. 8, the optimal performance is achieved with an interrogating pulse width of approximately 106 nanoseconds, which corresponds exactly with one-half of the period of a 4.7 MHz signal, the frequency of the excitation voltage pulse applied to the ultrasonic transducer 10. Since the second step function of the 4.7 MHz signal is inverted, constructive interference between its positive going pulse and its negative going pulse occur which causes a strong response signal. Similarly, an excitation voltage pulse of width 212 nanoseconds results in maximum destructive interference and return pulse energy, and therefore, signal value is minimized. Thus, in order to maximize received power, the frequency of the excitation voltage pulse should be such that constructive interference occurs between adjacent half-cycles of the interrogating pulse. Therefore, the performance of transducer 10 is optimized by calibrating the excitation pulse so that the width of the excitation pulse matches the natural mechanical resonant frequency of transducer 10.

Figure 9:
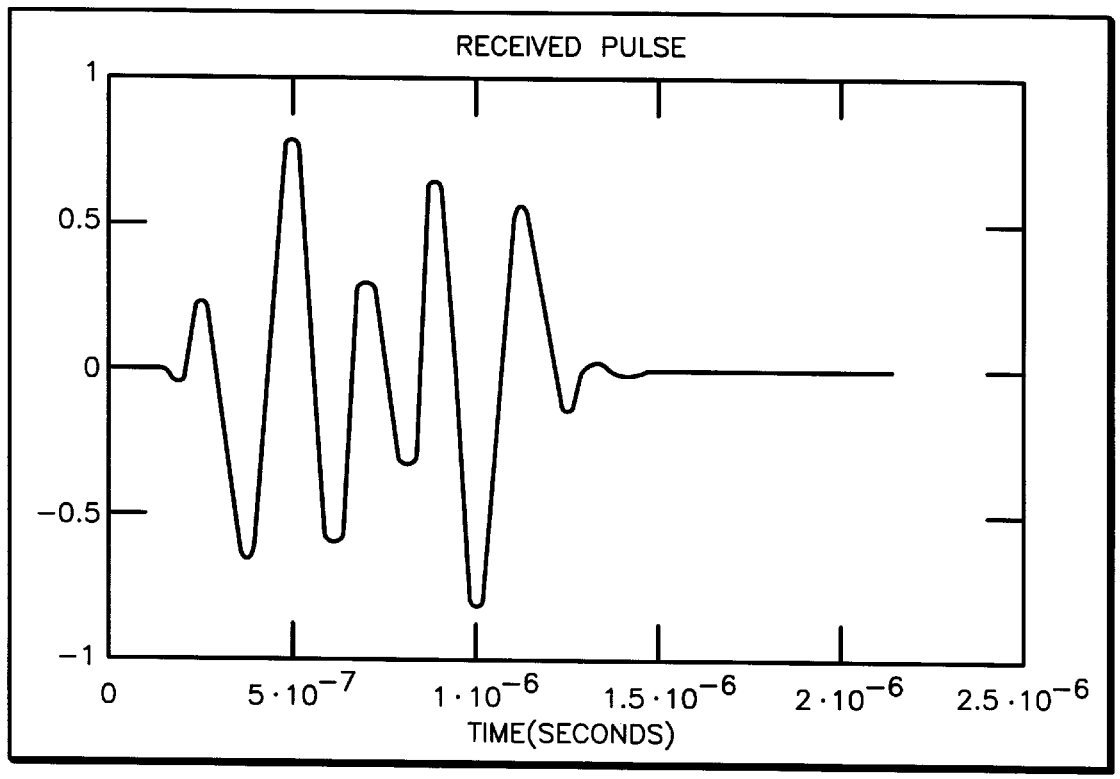
FIG. 9 is a graphical illustration of a signal received by the transducer of FIG. 1 in response to a 500 nanosecond step input pulse.

The present invention can also be thought of as a focusing technique which improves the accuracy of the inspection performed by ultrasonic transducer 10. As previously mentioned, the thickness of the wall of a gas pipe being inspected is measured by timing the difference between return pulses from the surface defining the inner diameter of the pipe and the surface defining the outer diameter of the pipe. A return pulse such as that illustrated in FIG. 6 for a 100 nanosecond interrogation pulse which, as previously discussed, is relatively close to the optimum pulse width produces a fairly narrow time period in which to trigger the countering mechanism timing the time difference between the return pulses. In comparison, a pulse width of 500 nanoseconds, which is not matched to the natural mechanical resonant frequency of transducer 10, produces in transducer 10 the return pulse response illustrated in FIG. 9. The return pulse of FIG. 9 produces a time period over twice as long as that of the closely matched pulse width in which to determine the appropriate time to trigger the countering mechanism. Thus, the inaccuracy of the return pulse associated with an unmatched interrogating pulse inhibits the accurate triggering of the countering which results in a less accurate inspection.

In practice, the forgoing method of pulse width calibration can be performed empirically during fabrication of the scan assembly or while in use inspecting a gas pipe of a particular composition, such as steel, cast iron or plastic. Performing the pulse width calibration on the transducer 10 while in use provides maximum benefit where physical pressures on the transducers and the coupling medium cause variations in the mechanical resonant frequency of the transducer. In addition, both the coupling medium and the material comprising the wall of the gas pipe have their own natural mechanical resonant frequencies which contribute to the constructive interference and/or destructive interference of the interrogating pulse. In these instances, an adaptive adjustable pulse width transmitter would insure maximum energy transfer during each use of the scan assembly under varying inspection conditions. Further, the software controlling the transducer 10 can be made to periodically or on demand measure the effective mechanical resonant frequency of the transducer 10 and then modify the width of the interrogating pulse to match that mechanical resonant frequency of the transducer. In such case, the software would merely mirror the experiment described hereinbefore whereby the pulse width that produces the return pulse of the greatest energy is determined.

Alternatively, pulse width calibration can be performed analytically based upon the impulse response of the transducer 10. From this determination, the period and pulse width of the interrogating pulse which results in constructive interference between adjacent half-cycles of the interrogating pulse can be calculated. In this manner, the width of the interrogating pulse is matched to the natural mechanical resonant frequency of ultrasonic transducer 10.

Moreover, it will be understood that the invention is not restricted to the particular embodiments described herein, and that many modifications can be made to such embodiments by one skilled in the art without departing from the spirit of the invention, as defined by the claims set forth hereafter.

Wherefore, the following is claimed:

1. An apparatus for inspecting a pipe using an ultrasonic transducer, the apparatus capable of calibrating the width of an excitation pulse to produce maximum energy transfer in said ultrasonic transducer, comprising:

first means for determining a mechanical resonant frequency of said transducer, wherein said mechanical resonant frequency may change during operation according to variations in the physical environment surrounding said transducer in said pipe;

second means for creating an excitation pulse with a frequency substantially equal to said mechanical resonant frequency resulting in maximum mechanical energy transfer from said transducer to said pipe;

third means for automatically initiating the determination of said mechanical resonant frequency of said transducer at predetermined times to maintain maximum energy transfer in said ultrasonic transducer; and fourth means for initiating the determination of said mechanical resonant frequency of said transducer on demand.

2. The apparatus of claim 1, wherein said first means further comprises:

a first calibration pulse generating means for generating a first calibration pulse, said first calibration pulse resulting in a first echo;

a second calibration pulse generating means for generating a second calibration pulse with a period varying from that of said first calibrating pulse by a predetermined amount of time, said second calibration pulse resulting in a second echo; and a resonant frequency estimation means for estimating the period of a calibrated pulse equaling the resonant frequency of said transducer based on upon the magnitude of said first and second echoes.

3. The apparatus of claim 1, wherein said first means further comprises:

a calibration pulse generating means for producing calibration pulses, said calibration pulses having different time periods separated by a predetermined amount of time, wherein said calibration pulses generate corresponding calibration echoes; and a resonant frequency determination means for estimating the frequency of a calibrated pulse equaling the resonant frequency of said transducer based on upon the magnitude of said calibration echoes.

4. A method for the calibration of an excitation pulse to produce maximum energy transfer in an ultrasonic transducer used in the inspection of a pipe comprising the steps of:

determining a mechanical resonant frequency of said ultrasonic transducer, wherein said mechanical resonant frequency may change during operation according to variations in the physical environment surrounding said transducer in said pipe;

creating an excitation pulse with a frequency substantially equal to said mechanical resonant frequency;

transmitting said excitation pulse to said ultrasonic transducer, thereby creating a sonic pulse with maximum mechanical energy transfer from said transducer to said pipe;

automatically initiating said determination of said mechanical resonant frequency of said transducer at predetermined times to maintain maximum energy transfer in said ultrasonic transducer; and initiating the determination of said mechanical resonant frequency of said transducer on demand.

5. The method of claim 4, wherein the step of determining a mechanical resonant frequency of said ultrasonic transducer further comprises the steps of:

generating a first calibration pulse, said first calibration pulse resulting in a first echo;

generating a second calibration pulse with a period varying from that of said first calibrating pulse by a predetermined amount of time, said second calibration pulse resulting in a second echo; and estimating the period of a calibrated pulse equaling the resonant frequency of said transducer based on upon the magnitude of said first and second echoes.

6. The method of claim 1, wherein the step of determining a mechanical resonant frequency of said ultrasonic transducer further comprises the steps of:

generating calibration pulses, said calibration pulses having different time periods separated by a predetermined amount of time, wherein said calibration pulses generate corresponding calibration echoes; and estimating the frequency of a calibrated pulse equaling the resonant frequency of said transducer based on upon the magnitude of said calibration echoes.

* * * * *